United States Patent
East et al.

[11] Patent Number: 5,841,118
[45] Date of Patent: Nov. 24, 1998

[54] REMOTE CONTROL OPERATING DEVICE FOR USE WITH AN ELECTRONIC BANKING MACHINE

[75] Inventors: Errol Peter East, Westville; Frank Brooks, Pinetown, both of South Africa

[73] Assignee: Impro Technologies (PTY) Ltd., Pinetown, South Africa

[21] Appl. No.: 872,096

[22] Filed: Jun. 10, 1997

[51] Int. Cl.$^6$ ........................................... G06F 17/60
[52] U.S. Cl. ........................................ 235/379; 235/380
[58] Field of Search ................................ 235/379, 380

[56] References Cited

U.S. PATENT DOCUMENTS 5,748,737  5/1998  Daggar .................................... 238/379

*Primary Examiner*—Harold Pitts
*Attorney, Agent, or Firm*—Senninger, Powers, Leavitt & Roedel

[57] ABSTRACT

A remote control banking system comprises an automatic teller machine (ATM) and a remote control operating device. The ATM includes a processor, a signal receiver that is linked to the processor and an electro-magnetic coil. The device is in the form of a portable, hand-held unit and includes a keypad for entering a confidential code associated with a person wishing to perform a transaction via the ATM. The device includes a microprocessor incorporating a data base for storing a preset code containing predetermined information on the banking account of the person. The device includes a signal generator for generating radio frequency signals from the confidential and preset codes, and transmitters and for transmitting the signals to the signal receiver. The device includes an electro-magnetic coil which is energised to provide power for the device when in proximity with the electro-magnetic coil of the ATM.

16 Claims, 1 Drawing Sheet

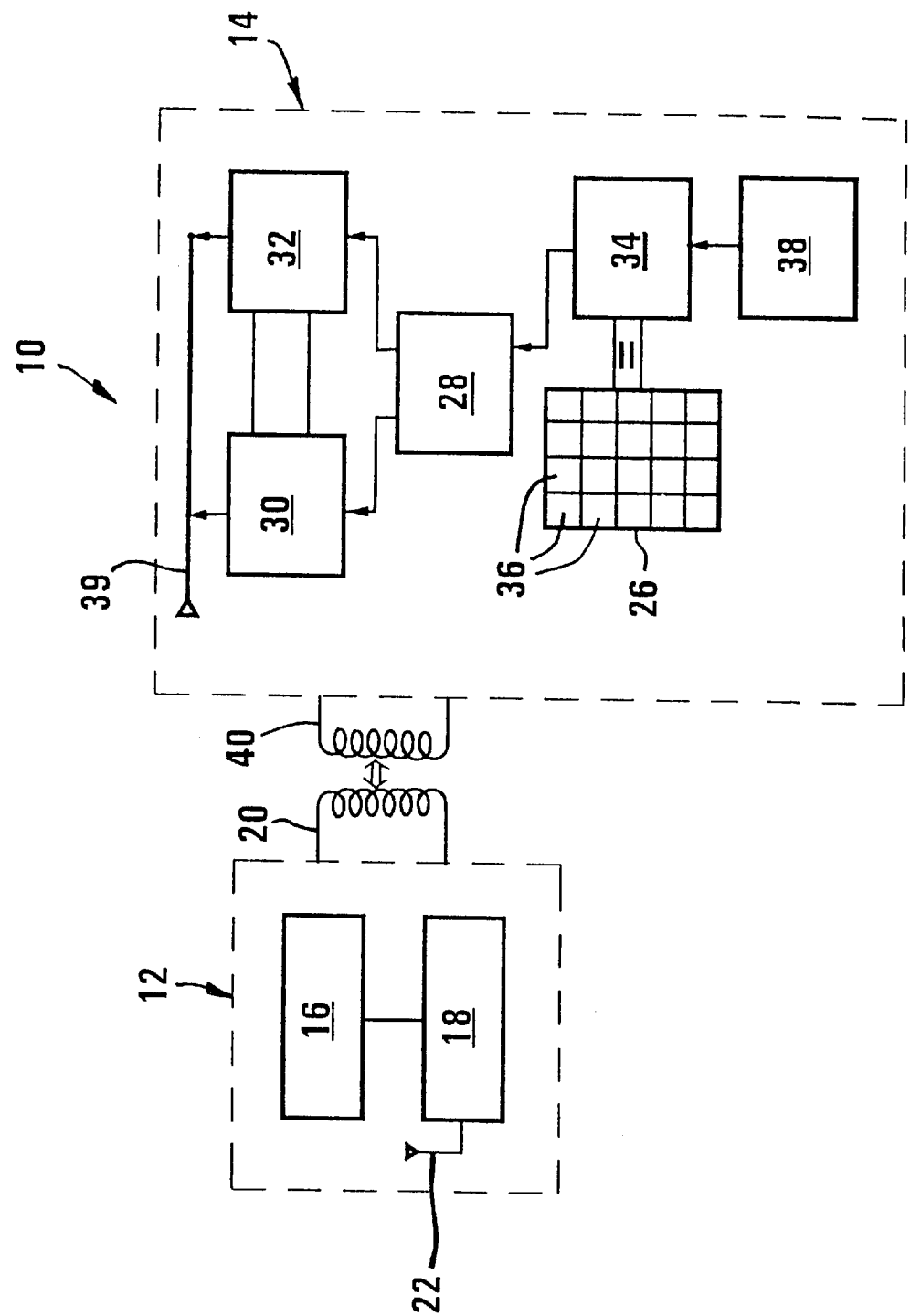

REMOTE CONTROL OPERATING DEVICE FOR USE WITH AN ELECTRONIC BANKING MACHINE

BACKGROUND OF THE INVENTION

THIS INVENTION relates to a remote control operating device for use with an electronic banking machine such as an automatic teller machine, and the like. Electronic banking machines (hereinafter abbreviated EBM's) particularly in the form of automatic teller machines (hereinafter abbreviated as ATM's) have been in use for a number of years. Such EBM's include electronic processing means that is linked to a key pad that permits a person wishing to effect a transaction via the EBM, to enter a confidential code into the electronic processing means thereof. As such, a transaction via an EBM is commenced by a bank card holder inserting a bank card encoded with information relating to the bank card holder's banking account, into the EBM and thereafter entering a confidential code in the form of a personal identification number (hereinafter abbreviated PIN), into the EBM. If the confidential code entered is identified to be associated with a code encoded on the bank card, the EBM in communication with a central processing means, will authorise predetermined functions to be performed on the EBM pursuant to appropriate instructions being entered into the EBM. For example, in the case of an ATM, such instructions may involve the withdrawal of cash money from the banking account with which the particular bank card is associated.

The incidence of fraudulent transactions associated with EBM's and, particularly, fraudulent withdrawals from ATM's has increased in recent times. Fraudulent withdrawals from, for example, ATM's typically occur after a third party has seen and memorised a PIN being entered by a bank card holder at an EBM and thereafter obtains possession of the bank card, for example, by stealing it.

Any reference hereinafter to an EBM must be interpreted to mean an EBM of the above general type.

SUMMARY OF THE INVENTION

It is an object of the present invention to provide a remote control operating device for use with an EBM that ameliorates the problem of fraudulent transactions performed via EBM's.

According to a first aspect of the invention there is provided a remote control operating device for use with an EBM having processing means and code receiving means for receiving coded information and for communicating the coded information received to the processing means, the EBM including auxiliary power supply means, the remote control operating device being in the form of a portable unit and including a keypad which permits a person wishing to perform a transaction via the EBM, to enter a confidential code associated with such person;

memory means for storing a preset code containing information on the banking account of a person wishing to perform a transaction via the EBM, the memory means permitting the transferral of the preset code to the code receiving means of the EBM;

signal generating means for generating a confidential coded electronic signal from the confidential code, that can be transmitted through space;

transmitting means for transmitting the confidential coded signal to the code receiving means of the EBM;

power supply means that is energized when in predetermined proximity with the auxiliary power supply means of the EBM for providing the required power for the operation of the remote control operating device; and processing means for controlling the operation of the signal generating means and the transmitting means.

The signal generating means may be operable to generate a preset coded electronic signal from the preset code, that can be transmitted through space, with the transmitting means being operable to transmit the preset coded signal to the signal receiving means of the EBM.

The processing means may control, firstly, the transmission of the preset coded signal by the transmitting means and, secondly, the transmission of the confidential coded signal thereby if the preset coded signal is accepted by the processing means of the EBM.

The transmitting means may include a first transmitter for transmitting the preset coded signal and a second transmitter for transmitting the confidential coded signal.

The memory means may form part of the processing means.

In an arrangement wherein the auxiliary power supply means of the EBM includes a continuously energized electro-magnetic coil, the power supply means of the remote control operating device may include a complementary electro-magnetic coil which is energized to provide power for the remote control operating device when it is in predetermined proximity with the electro-magnetic coil of the EBM, by means of electro-magnetic induction between the coils.

The keypad of the remote control operating device may be operable to permit instructions for the EBM to perform transactions therewith, to be entered into the EBM via the keypad, with the signal generating means being operable to generate a coded signal carrying said instructions, which can be transmitted through space, via the transmitting means, to the code receiving means of the EBM.

The remote control operating device may be operable only to access the EBM, with transactions via the EBM being performed thereafter by entering instructions into the EBM via its own keypad.

According to a second aspect of the invention there is provided a remote control banking system, comprising an EBM having processing means and code receiving means for receiving coded information and for communicating the coded information received to the processing means, the EBM including auxiliary power supply means;

a remote control operating device in the form of a portable unit, including a keypad which permits a person wishing to perform a transaction via the EBM, to enter a confidential code associated with such person;

memory means for storing a preset code containing information on the banking account of a person wishing to perform a transaction via the EBM, the memory means permitting the transferral of the preset code to the code receiving means of the EBM;

signal generating means for generating a confidential coded electronic signal from the confidential code, that can be transmitted through space; transmitting means for transmitting the confidential coded signal to the code receiving means of the EBM;

power supply means that is energized when in predetermined proximity with the auxiliary power supply means of the EBM; and processing means for controlling the operation of the signal generating means and the transmitting means.

The signal generating means may be operable to generate a preset coded electronic signal from the preset code, that can be transmitted through space, with the transmitting means being operable to transmit the preset coded signal to the signal receiving means of the EBM.

The processing means may control, firstly, the transmission of the preset coded signal by the transmitting means and, secondly, the transmission of the confidential coded signal thereby if the preset coded signal is accepted by the processing means of the EBM.

The transmitting means may include a first transmitter for transmitting the signal and a second transmitter for transmitting the confidential coded signal.

The memory means of the remote control banking system may form part of the processing means.

In an arrangement wherein the auxiliary power supply means of the EBM includes a continuously energized electro-magnetic coil, the power supply means of the remote control operating device may include a complementary electro-magnetic coil which is energized to provide power for the remote control operating device when it is in predetermined proximity with the electro-magnetic coil of the EBM, by means of electro-magnetic induction between the coils.

The keypad of the remote control operating device may be operable to permit instructions for the EBM to perform transactions therewith, to be entered into the EBM via the keypad, with the signal generating means being operable to generate a coded signal carrying said instructions, which can be transmitted through space, via the transmitting means, to the code receiving means of the EBM.

The remote control banking system may be operable only to access the EBM, with transactions via the EBM being performed thereafter by entering instructions into EBM via its own keypad.

BRIEF DESCRIPTION OF THE DRAWINGS

Further features of the invention, including the mode of use thereof, are described in more detail hereinafter with reference to and as illustrated in the accompanying diagrammatic drawing which depicts a schematic block diagram of a remote control banking system including a remote control operating device in accordance with the invention.

DESCRIPTION OF THE PREFERRED EMBODIMENT

With reference to the drawing, a remote control banking system, including a remote control operating device in accordance with the invention, is designated generally by the reference numeral 10. The remote control banking system 10 comprises, broadly, an EBM in the form of an ATM 12 and a remote control operating device, in accordance with the invention, designated generally by the reference numeral 14.

The ATM 12 has processing means in the form of a processor 16 and code receiving means in the form of a signal receiver 18 for receiving electronic signals transmitted to it through space and for communicating the signals received to the processor 16. The signal receiver 18 includes a pick-up antenna 22 for receiving radio frequency signals. The ATM 12 has auxiliary power supply means in the form of a continuously energised electro-magnetic coil 20 linked to the power source of the ATM, the purpose of which coil will become apparent hereinafter.

The remote control operating device 14 is in the form of a portable hand-held unit and includes a keypad 26 for entering a confidential code associated with a person wishing to perform a transaction via the ATM 12. The keypad 26 comprises a number of touch keys 36 which are each associated with a number, and which can be pressed by a user to enter a confidential code in the form of a PIN associated with a person wishing to effect a transaction via the EBM.

The remote control operating device 14 includes signal generating means in the form of a signal generator 28 for generating a confidential coded radio frequency signal from the confidential code, that can be transmitted through space, transmitting means comprising a first transmitter 30 and a second transmitter 32 for transmitting coded radio frequency signals to the signal receiver 18. The remote control operating device includes processing means in the form of a microprocessor 34 for controlling the transmission of the coded radio frequency signals by the first and second transmitting means 30 and 32, respectively. The microprocessor 34 incorporates memory means in the form of a data base 38 for storing a preset code containing predetermined information on the banking account of a person wishing to perform a transaction via the ATM. As such, the signal generator 28 is operable to generate a preset coded radio frequency signal from the preset code, that can be transmitted through space.

The first transmitter 30 of the transmitting means is operable to transmit a preset coded radio frequency signal, carrying predetermined information on the banking account of a person wishing to effect a transaction via an EBM, to the signal receiver 18 of the ATM 12. The second transmitter 32 of the transmitting means is operable to transmit a radio frequency signal carrying the PIN of the person, to the signal receiver 18 of the ATM. In use, the signals transmitted from the remote control operating device 12, via its first and second transmitters, are received by the signal receiver 18 via its antenna 22.

The first and second transmitters 30 and 32, respectively, are also associated with an antenna 39 to facilitate transmission of electronic signals therefrom.

The microprocessor 34 of the remote control operating device 14 controls, firstly, the transmission of a preset coded signal by the first transmitter 30 and, secondly, the transmission of a confidential coded signal carrying the PIN of a person wishing to effect transactions via the ATM, by the second transmitter 32 if the signal transmitted by the first transmitter is accepted by the processor 16 of the ATM.

The remote control operating device includes power supply means including an electro-magnetic coil 40 which is operatively energised to provide power for the remote control operating device when it is in the proximity of the electro-magnetic coil 20 of the ATM by means of electro-magnetic induction between the coils.

In use, when a person wishes to effect a transaction via an ATM, the first transmitter 30 is activated by the person to transmit a preset coded radio frequency signal to the signal receiver 18 of the ATM 12. If the processor 16 of the ATM accepts the preset coded signal, the person can then enter a confidential code in the form of a personal identification number (PIN) into the keyboard 26 of the remote control operating device 14. A confidential coded radio frequency signal carrying the PIN is then transmitted, via the second transmitter 32, to the receiver 18 of the ATM 12. If this confidential coded signal is accepted by the processor 16 of the ATM, predetermined functions to be performed on the ATM pursuant to appropriate instructions being entered into the ATM, will be authorised. As such, the use of a bank card for accessing an ATM to effect a transaction relating to a person's bank account, is obviated.

The keyboard 26 of the remote control operating device 14 allows instructions for the ATM 12 to perform transactions therewith, to be entered into the ATM via the keyboard 26, with the signal generator 28 being operable to generate a coded signal carrying the instructions, which can be transmitted through space via one of the first and second transmitter, to the signal receiver 18 of the ATM 12. In another embodiment of the invention, the remote control operating device 14 is operable only to access the ATM 12, with transactions via the ATM being performed thereafter by entering instructions into the ATM via its own keyboard.

As the confidential coded signal that is transmitted, in use, by the second transmitter 32 of the remote control operating device 14, is associated with a particular person authorised to perform transactions via the ATM 12 using the remote control operating device, the unauthorised use of the remote control operating device 14 to perform transactions via the ATM, is prevented. Thus, only once the processor 16 of the ATM has accepted both of the preset coded signal and the confidential coded electronic signal, are transactions via the ATM permitted. As the remote control operating device is hand-held, it can be held in a person's hand in a manner in which the keypad 26 thereof is obscured from the field of vision of other persons in the vicinity of the ATM, thereby reducing the risk of others gaining knowledge of the person's PIN.

The Applicant believes that the remote control operating device of the invention will reduce the incidence of fraudulent withdrawals being effected from electronic banking machines, particularly in situations where knowledge is obtained of a person's PIN and the person's bank card is stolen.

We claim:

1. A remote control operating device for use with an EBM having processing means and code receiving means for receiving coded information and for communicating the coded information received to the processing means, the EBM including auxiliary power supply means, the remote control operating device being in the form of a portable unit and including a keypad which permits a person wishing to perform a transaction via the EBM, to enter a confidential code associated with such person;

memory means for storing a preset code containing information on the banking account of a person wishing to perform a transaction via the EBM the memory means permitting the transferral of the preset code to the code receiving means of the EBM;

signal generating means for generating a confidential coded electronic signal from the confidential code, that can be transmitted through space;

transmitting means for transmitting the confidential coded signal to the code receiving means of the EBM;

power supply means that is energized when in predetermined proximity with the auxiliary power supply means of the EBM for providing the required power for the operation of the remote control operating device; and processing means for controlling the operation of the signal generating means and the transmitting means.

2. A remote control operating device as claimed in claim 1, wherein the signal generating means is operable to generate a preset coded electronic signal from the preset code, that can be transmitted through space, with the transmitting means being operable to transmit the preset coded signal to the signal receiving means of the EBM.

3. A remote control operating device as claimed in claim 2, wherein the processing means controls, firstly, the transmission of the preset coded signal by the transmitting means and, secondly, the transmission of the confidential coded signal thereby if the preset coded signal is accepted by the processing means of the EBM.

4. A remote control operating device as claimed in claim 3, wherein the transmitting means includes a first transmitter for transmitting the preset coded signal and a second transmitter for transmitting the confidential coded signal.

5. A remote control operating device as claimed in claim 4, wherein the memory means forms part of the processing means.

6. A remote control operating device as claimed in claim 5, wherein the auxiliary power supply means of the EBM includes a continuously energized electro-magnetic coil, the power supply means of the remote control operating device including a complementary electro-magnetic coil which is energized to provide power for the remote control operating device when it is in predetermined proximity with the electro-magnetic coil of the EBM, by means of electro-magnetic induction between the coils.

7. A remote control operating device as claimed in claim 6, wherein the keypad thereof is operable to permit instructions for the EBM to perform transactions therewith, to be entered into the EBM via the keypad, with the signal generating means being operable to generate a coded signal carrying said instructions, which can be transmitted through space, via the transmitting means, to the code receiving means of the EBM.

8. A remote control operating device as claimed in claim 6, that is operable only to access the EBM, with transactions via the EBM being performed thereafter by entering instructions into the EBM via its own keypad.

9. A remote control banking system, comprising an EBM having processing means and code receiving means for receiving coded information and for communicating the coded information received to the processing means, the EBM including auxiliary power supply means;

a remote control operating device in the form of a portable unit, including a keypad which permits a person wishing to perform a transaction via the EBM, to enter a confidential code associated with such person;

memory means for storing a preset code containing information on the banking account of a person wishing to perform a transaction via the EBM, the memory means permitting the transferral of the preset code to the code receiving means of the EBM;

signal generating means for generating a confidential coded electronic signal from the confidential code, that can be transmitted through space; transmitting means for transmitting the confidential coded signal to the code receiving means of the EBM;

power supply means that is energized when in predetermined proximity with, the auxiliary power supply means of the EBM; and processing means for controlling the operation of the signal generating means and the transmitting means.

10. A remote control banking system as claimed in claim 9, wherein the signal generating means is operable to generate a preset coded electronic signal from the preset code, that can be transmitted through space, with the transmitting means being operable to transmit the preset coded signal to the signal receiving means of the EBM.

11. A remote control banking system as claimed in claim 10, wherein the processing means controls, firstly, the transmission of the preset coded signal by the transmitting means and, secondly, the transmission of the confidential coded signal thereby if the preset coded signal is accepted by the processing means of the EBM.

12. A remote control banking system as claimed in claim 11, wherein the transmitting means includes a first transmitter for transmitting the signal and a second transmitter for transmitting the confidential coded signal.

13. A remote control banking system as claimed in claim 12, wherein the memory means forms part of the processing means.

14. A remote control banking system as claimed in claim 13, wherein the auxiliary power supply means of the EBM includes a continuously energized electro-magnetic coil, the power supply means of the remote control operating device including a complementary electro-magnetic coil which is energized to provide power for the remote control operating device when it is in predetermined proximity with the electro-magnetic coil of the EBM, by means of electro-magnetic induction between the coils.

15. A remote control banking system as claimed in claim 14, wherein the keypad thereof is operable to permit instructions for the EBM to perform transactions therewith, to be entered into the EBM via the keypad, with the signal generating means being operable to generate a coded signal carrying said instructions, which can be transmitted through space, via the transmitting means, to the code receiving means of the EBM.

16. A remote control banking system as claimed in claim 14, that is operable only to access the EBM, with transactions via the EBM being performed thereafter by entering instructions into the EBM via its own keypad.

* * * * *